United States Patent
On

(10) Patent No.: US 9,100,832 B2
(45) Date of Patent: Aug. 4, 2015

(54) METHOD AND APPARATUS FOR SELF ORGANIZED NETWORK

(75) Inventor: Hanson On, Escondido, CA (US)

(73) Assignee: AIRHOP COMMUNICATIONS, INC., San Diego, CA (US)

(*) Notice: Subject to any disclaimer, the term of this patent is extended or adjusted under 35 U.S.C. 154(b) by 253 days.

(21) Appl. No.: 12/915,418

(22) Filed: Oct. 29, 2010

(65) Prior Publication Data

US 2011/0105139 A1 May 5, 2011

Related U.S. Application Data

(60) Provisional application No. 61/256,864, filed on Oct. 30, 2009.

(51) Int. Cl.
| | |
|---|---|
| *H04W 4/00* | (2009.01) |
| *H04W 24/00* | (2009.01) |
| *H04W 72/00* | (2009.01) |
| *H04W 16/10* | (2009.01) |
| *H04W 16/04* | (2009.01) |
| *H04W 84/18* | (2009.01) |

(52) U.S. Cl.
CPC .............. *H04W 16/10* (2013.01); *H04W 16/04* (2013.01); *H04W 84/18* (2013.01)

(58) Field of Classification Search
CPC .... H04W 24/00; H04W 72/082; H04W 28/00
USPC ........................ 455/422.1, 423, 424, 450–454
See application file for complete search history.

(56) References Cited

U.S. PATENT DOCUMENTS

| | | | |
|---|---|---|---|
| 2007/0117537 A1* | 5/2007 | Hui et al. ....................... | 455/405 |
| 2008/0107076 A1* | 5/2008 | Ramachandran et al. ..... | 370/331 |
| 2009/0296635 A1* | 12/2009 | Hui et al. ....................... | 370/328 |
| 2009/0296641 A1* | 12/2009 | Bienas et al. ................. | 370/329 |
| 2010/0144365 A1* | 6/2010 | Pan et al. ....................... | 455/453 |
| 2010/0222062 A1* | 9/2010 | Chou et al. .................... | 455/449 |
| 2010/0254344 A1* | 10/2010 | Wei et al. ...................... | 370/330 |
| 2011/0053598 A1* | 3/2011 | Ahluwalia .................... | 455/436 |
| 2012/0108232 A1* | 5/2012 | Viering et al. ................ | 455/424 |

FOREIGN PATENT DOCUMENTS

WO    WO 2008004561 A1 *  1/2008

* cited by examiner

*Primary Examiner* — Dung Hong
(74) *Attorney, Agent, or Firm* — Hayes Soloway P.C.

(57) ABSTRACT

A self-organizing wireless network (SON) includes a plurality of base stations. Each base station includes a SON component for coordinating radio resource allocation with other base stations and a radio resource management component for accepting an allocation from the SON component and managing usage of that allocation for end user equipment associated with its base station. The base stations provide access to a plurality of end user equipment. The SON may include a server for communicating with the SON component for coordinating of radio resource allocation. The self-organizing wireless network may include a central control for communicating with the SON component for coordinating of radio resource allocation. Coordinating of radio resources relates to physical channels, transmit power, spatial resource allocation, admission control, load balancing, coordinating network elements in groups and includes adapting to addition of and reduction of network elements in a group in real time.

12 Claims, 3 Drawing Sheets

METHOD AND APPARATUS FOR SELF ORGANIZED NETWORK

RELATED APPLICATIONS

This application claims benefit of priority to U.S. Provisional Application No. 61/256,864, filed on Oct. 30, 2009, which is incorporated in its entirety by reference as if fully set forth.

FIELD OF THE INVENTION

The present invention relates to methods and apparatuses for the self organized network (SON) and is particularly concerned with wireless network performance that is subject to inter-cell interference.

BACKGROUND OF THE INVENTION

This section is not to be construed as reflecting an admission that any content herein is relevant prior art. Moreover, this section is not an indication of a search for relevant disclosures. All statements are based on available information and are not an admission as to their accuracy or correctness.

The explosive adoption of video-enabled wireless mobile devices has caused an explosion of data traffic and exposed the capacity constraints of conventional wireless network topology.

Conventional wireless network (e.g. cellular network) deployment requires careful planning to maximize frequency reuse, minimize coverage dead zones and minimize inter-cell interference. The deployment is labour intensive due to significant amount of measurements and field trials. To reduce the cost of deployment, many network operators deploy macro cells which provide larger coverage footprint and higher capacity. This approach works when the subscribers' service types are mainly conversational (i.e. voice), interactive (e.g. web browsing, instant messaging etc.) or low rate streaming. These are the typical service types for 2G (e.g. GSM) and early 3G (e.g. UMTS Release 99 and CDMA2000) cellular networks where macro cell provides adequate quality of service to fulfill majority subscriber's needs.

More subscribers demand for faster data service as the bit rate at the air interface increases with the advance of the wireless technology (i.e. 3.5G and 4G). One example of 4G networks is LTE (3GPP Release 8 and beyond), another is WiMax (IEEE802.16e and beyond). Given the limited available spectrum, the capacity becomes a serious issue for conventional macro cell. The capacity issue has caused a shift in cellular network deployment paradigm from well partitioned large coverage macro cells to densely deployed smaller cells (e.g. picocell and femtocell), many being added dynamically in non-fixed locations.

Today's SONs (i.e. self configuration and provision) are not sufficient for densely deployed small cells to operate properly. SONs capable of coordinating among neighboring cells on radio resource allocation is essential for densely deployed small cells to operate properly.

SUMMARY OF THE INVENTION

The present invention provides system architecture and design for Self-Organized Network (SON) that can be applied, but not limited to, 3G/4G wireless cellular networks and beyond, as well as other wireless networks.

In accordance with an aspect of the present invention there is provided a SON system for optimizing the network performance (e.g. capacity, throughput, quality of service) by coordinating network elements in groups.

In accordance with another aspect of the present invention there is provided a method of SON, the method comprising the steps of enabling each network elements to communicate with a server interfacing with each server and sending a message from a network element to a selected server. The server can be in a centralized location such as gateway or radio network controller, or it can be in one of the network element in core network.

In accordance with another aspect of the present invention there is provided a method of SON, the method comprising the steps of enabling each network elements to communicate with a peer in the SON, interfacing with neighboring peers in the SON and sending a message from a network element to a selected peer in the SON.

In accordance with another aspect of the present invention there is provided a system for SON functionality comprising functional components in a network element for coordinating with neighboring network elements to provide network access to user equipments.

In accordance with another aspect of the present invention there is provided a method of SON functionality, the method comprising the steps of functional components communicating with each other via different interfaces.

In accordance with another aspect of the present invention there is provided a method of SON, the method comprising the steps of forming coordination group.

In accordance with another aspect of the present invention there is provided a method of SON, the method comprising the step of adapting to addition and reduction of neighboring network element.

In accordance with another aspect of the present invention there is provided a method of SON, the method comprising the steps of coordinating with neighboring network elements.

In accordance with another aspect of the present invention there is provided a method and algorithm of SON, the method comprising the steps of multi-level radio resource management and allocation optimization process across the network elements and within each network element.

In accordance with another aspect of the present invention there is provided an algorithm of SON, the algorithm comprising the multivariate radio resource management and allocation optimization process.

In accordance with another aspect of the present invention there is provided a method and algorithm of SON functionality, the method comprising the steps of coordinating radio resource related to physical channels such as orthogonal code allocation or sub-frequency allocation, or time frequency resource allocation with neighboring network elements in a multi-level and/or multivariate manner.

In accordance with another aspect of the present invention there is provided a method and algorithm of SON functionality, the method comprising the steps of coordinating radio resource related to transmit power with neighboring network elements in a multi-level and/or multivariate manner.

In accordance with another aspect of the present invention there is provided a method and algorithm of SON functionality, the method comprising the steps of coordinating radio resource related to spatial resource allocation such as beam forming with neighboring network elements in a multi-level and/or multivariate manner.

In accordance with another aspect of the present invention there is provided a method and algorithm of SON functionality, the method comprising the steps of coordinating admission control with neighboring network elements in a multi-level and/or multivariate manner.

In accordance with another aspect of the present invention there is provided a method and algorithm of SON functionality, the method comprising the steps of coordinating load balancing with neighboring network elements in a multi-level and/or multivariate manner.

The system optimizes the network performance (e.g. capacity, throughput, quality of service) by coordinating network elements in groups and adapting to the addition and reduction of network element in a group in real-time.

The present invention provides a system by utilizing logical communication links to form coordination groups to optimize network performance. The present invention defines SON from network topology to network elements as well as element functionality.

The present invention allows centralized, server assisted and distributed operation models.

BRIEF DESCRIPTION OF THE DRAWINGS

The present invention will be further understood from the following detailed description with reference to the drawings in which.

DETAILED DESCRIPTION OF MODES OF PRACTICING THE DISCLOSURE

Figure 1:
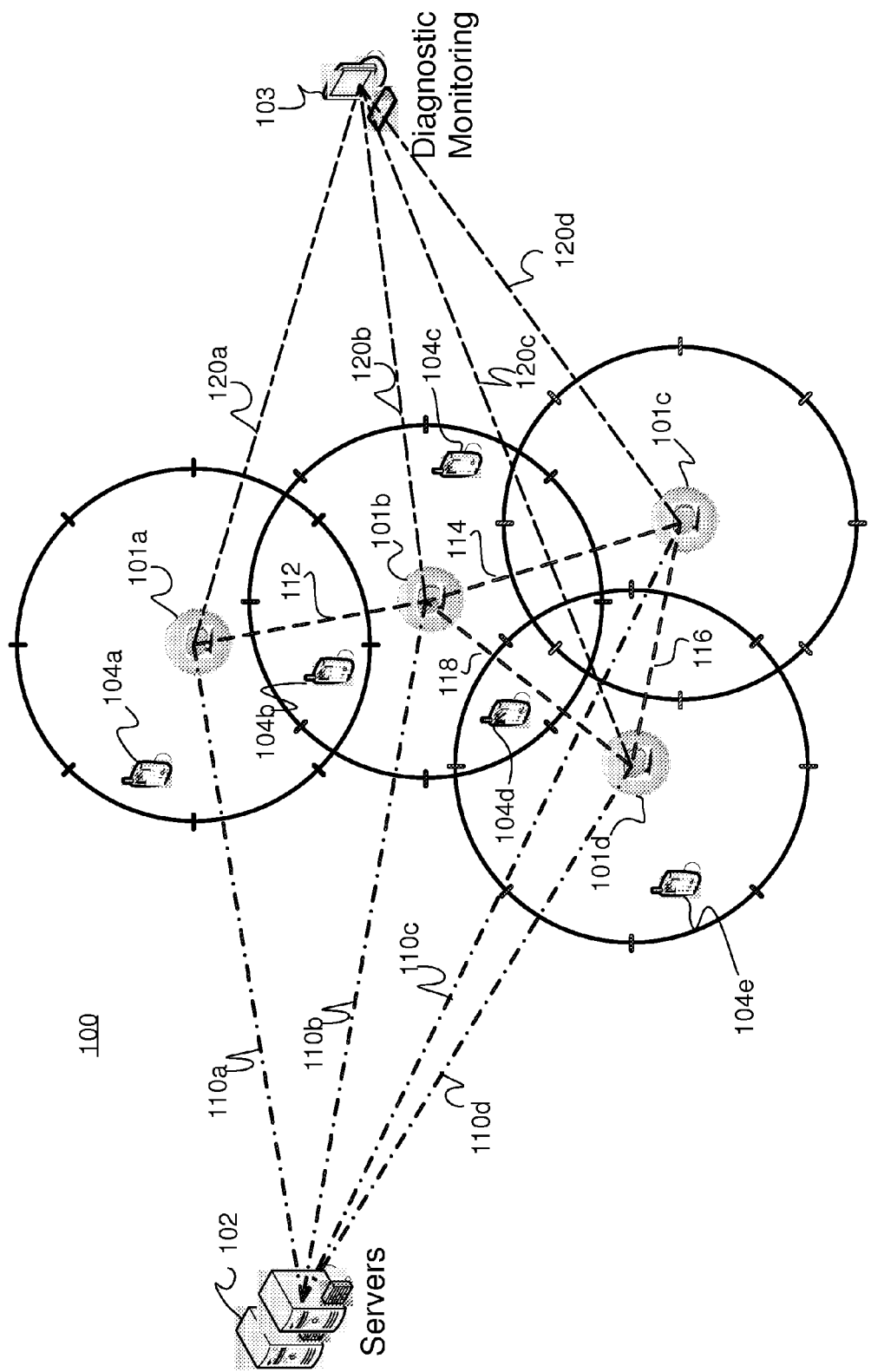
FIG. 1 illustrates the SON enabled network topology to which embodiments of the present invention are applied.

Referring to FIG. 1 there is illustrated SON topology that uses embodiments of the present invention. The SON system 100 includes different types of network elements and logical links. For example, the network elements can be, but not limited to, base stations 101, servers 102, diagnostic monitoring terminals 103 and user equipment 104. Logical links allow the network elements to communicate with each other. For example, the logical links can be, but not limited to, client-server logical links 110a to 110d, peer-to-peer logical links 112 to 118 and diagnostic and monitoring logical links 120a to 120d.

The base station 101 provides network access to user equipment 104. In addition, the base station 101 communicates with servers 102 via client-server logical link 110. The base station 101 performs registration by sending registration request message to registration server, as represented by server 102. The base station 101 can include its location information (e.g. GPS coordinates) in the registration request message to assist SON neighbour discovery and coordination group forming.

In another embodiment, a location server, as represented by server 102 processes base station location information (e.g. received by registration server) and forms neighbor list and/or a coordination group list (see Table A). For example, a neighbor list includes those base stations whose coverage footprints overlap with each other such that inter-cell interference are above a pre-determined threshold.

TABLE A

| Base Station | Location | Network Address | Resource 1 | Resource 2 | Resource 3 |
|---|---|---|---|---|---|
| 101 b | | | | | |
| 101c | | | | | |
| 101d | | | | | |

In another embodiment, a base station 101 sends a neighbour list request message to location server 102. The location server 102 compiles the neighbor list based upon the requesting base station's location information and sends the neighbour list back to the base station 101.

In another embodiment, two coordination groups are formed based the topology in FIG. 1, such that group 1 consists of 101a and 101b and group 2 consists of 101b, 101c and 101d. 101a coordinates with its neighbor 101b based on the list of neighbors from the location server 102. In addition, 101b coordinates with its other neighbors 101c and 101d based on the list of neighbors from the location server 102. The coordination can be, but not limited to, resource allocation and interference management as defined in later embodiments.

Figure 2:
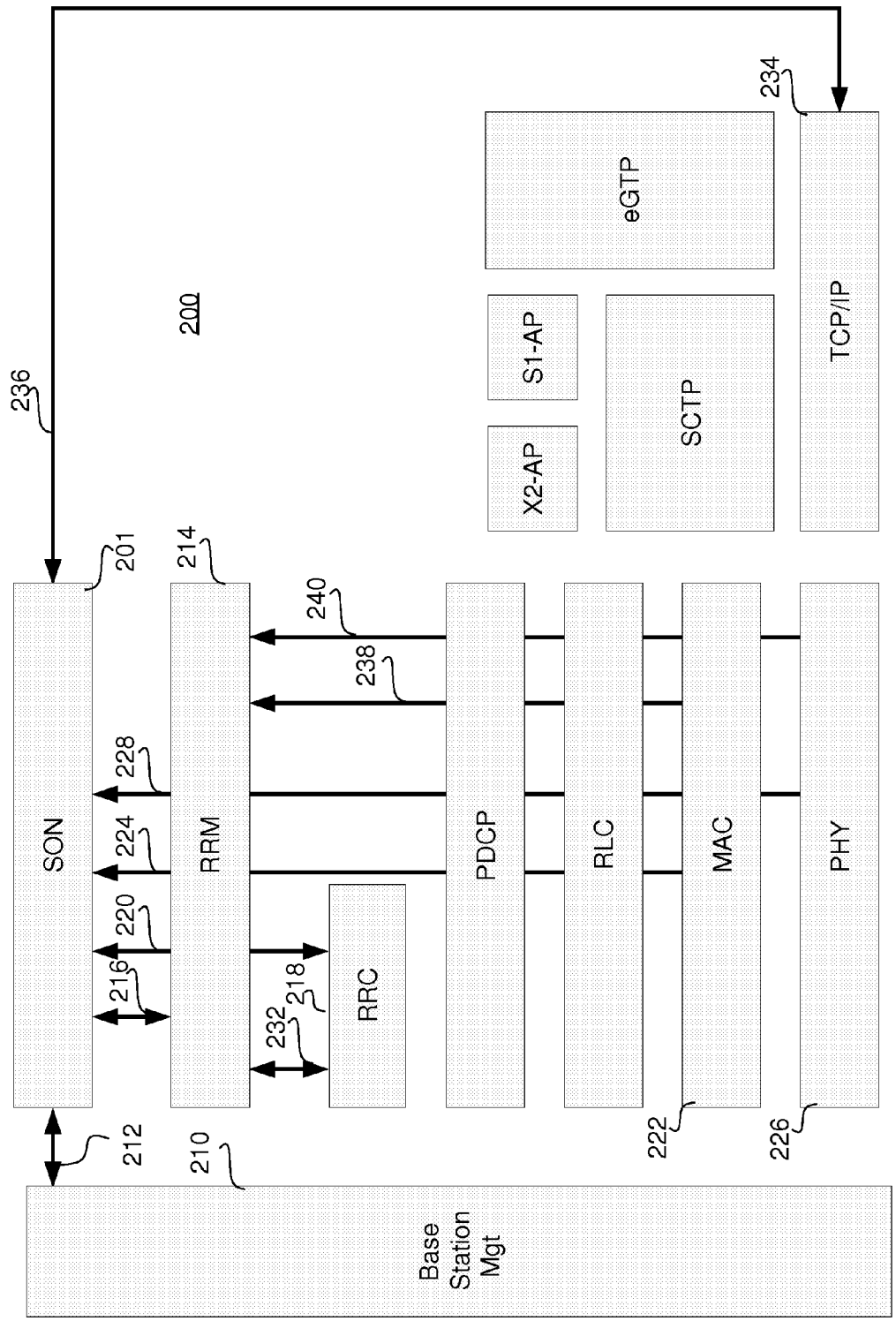
FIG. 2 illustrates the functional components of a network element (i.e. cellular base station)

Referring to FIG. 2 there is illustrated an architecture for a base station to act as a network element of a SON. The architecture 200 includes a SON functional component 201 that interacts with other functional components via different interfaces to perform SON functionality, such as communication with servers, updating status with diagnostic and monitoring terminals and coordinating with neighboring base stations on radio resource allocation and interference management.

A base station management functional component 210 manages SON functional component 201 via a first interface 212. The management functions can be, but not limited to, configuring, enable and disable SON functional component.

The SON functional component 201 coordinates with neighboring base stations on radio resource allocation, interference management, beam forming, access control, congestion control and hand over and delivers radio resource management related settings to radio resource management (RRM) functional component 214 via a second interface 216.

In another embodiment, the SON functional component 201 coordinates with neighbor base stations on resource allocation, interference management and beam forming and delivers configuration parameters to radio resource control (RRC) functional component 218 to configure radio access related functional components (e.g. PHY, sniffer, MAC, RCL and PDCP) via a third interface 220.

In another embodiment, the SON functional component 201 receives parameters (e.g. buffer status, frame error rate, bit error rate) from media access control (MAC) functional component 222 via a fourth interface 224. The SON functional component 201 processes the parameters and exchanges the outputs of the process with neighboring base station to coordinate resource allocation and interference management.

In another embodiment, the SON functional component 201 receives parameters (e.g. channel quality indication, ranking information, pre-coding matrix index, and received signal strength indication) from physical layer (PHY) and sniffer functional component 226 via a fifth interface 228. The SON functional component processes the parameters and exchanges the output of the process with neighboring base stations to coordinate resource allocation, interference management and beam forming.

In another embodiment, RRM functional component 214 delivers configuration parameters (e.g. admission control decision, congestion control decision, user equipment resource assignment) to RRC functional component 230 to configure radio access related functional components via a sixth interface 232.

In another embodiment, the SON functional component 201 communicates with servers utilizing TCP/IP functional component 234 via a seventh interface 236.

In another embodiment, the SON functional component 201 performs coordination with neighboring base stations by exchanging coordination messages utilizing TCP/IP functional component 234 via the seventh interface 236.

In another embodiment, the SON functional component 201 sends base station statistics and status to diagnostic monitoring terminals 103 utilizing TCP/IP functional component 234 via seventh interface 236.

In another embodiment, the RRM functional component 214 receives radio parameters (e.g. buffer status, frame error rate, bit error rate) from the MAC 222 via an eighth interface 238. The parameters are used for radio resource management decision making.

In another embodiment, the RRM functional component 214 receives parameters (e.g. channel quality indication, ranking indication, pre-coding matrix index, received signal strength indication) from PHY and sniffer 226 via a ninth interface 240. The parameters are used for radio management decision making.

In another embodiment, the SON functional component 201 forms coordination group autonomously by discovering its neighboring base stations on its own. For example, SON functional component in a cellular base station can go through the following steps to discover its neighbors and form coordination group:

Request the sniffer to detect and decode neighboring base station identifications (e.g. cell identification);

Request the network address (e.g. SIP ID or IP address and TCP/UDP port number) of a base station from server (e.g. registrar server);

Invite the neighbor to join the coordination group.

In another embodiment, the SON functional component 201 forms a coordination group with the assistance of a location server, such that the location server compiles neighbor lists based on individual base station location information and distributes the neighbor lists to corresponding base stations. The base station location information can be part of the registration message from individual base station. The SON functional component 201 invites the base stations in the neighbor list to join the coordination group.

In another embodiment, the SON functional component 201 adapts to the addition of a neighboring base station by periodically detecting and decoding neighboring base station identifications. When a new base station identification is detected, the SON functional component 201 invites the new neighboring base station to join the coordination group.

In another embodiment, SON functional component 201 adapts to the addition of a neighboring base station by receiving neighbor list updates from the location server. The location server can track the addition of a base station with the registration server, such that the registration server forwards base station location information to location server upon every registration. The location server updates neighbor lists and distributes the lists to base stations accordingly.

In another embodiment, the SON functional component 201 adapts to the reduction of a neighboring base station by periodically detect and decoding neighboring base station identifications. When a known base station identification is no longer detected over a specified period of time, SON functional component 201 updates its neighbor list and stops coordinating with that base station.

In another embodiment, SON functional component 201 adapts to the reduction of a neighboring base station by receiving neighbor list updates from the location server. The location server can track the reduction of a base station with a registration server, diagnostic and monitoring terminal or keep-alive messages. The location server updates neighbor lists and distributes the lists to base stations accordingly.

In another embodiment, SON functional component 201 coordinates, but not limited to, radio resource allocation with neighboring base stations autonomously, such that the coordination can take place in following steps:

All SON functional components 201 in a coordination group agree on an algorithm, e.g. radio resource allocation algorithm. One example of such algorithm can include some or all of the following radio resource allocations: orthogonal code, time, frequency, time-frequency, spatial/beam and power;

SON functional component 201 collects data (e.g. user equipment measurement reports, user equipment service types, user equipment QoS types, neighboring base station interference measurement reports, buffer status, available transmit power) within the base station;

SON functional component 201 process the data to produce the inputs required by the algorithm;

SON functional component 201 sends algorithm inputs to neighboring base stations;

SON functional component 201 receives algorithm inputs from neighboring base stations;

SON functional component 201 runs the algorithm on the same set of inputs (i.e. its own and neighboring base stations');

SON functional component 201 sends configuration messages to corresponding functional components base on the algorithm output.

In another embodiment, SON functional component 201 coordinates, but not limited to, radio resource allocation with neighboring base stations with the assistance of the server. The server assistant is meant to help out base stations that are not capable of running the algorithm locally.

The server and SON functional components of SON capable base stations agree on an algorithm.

SON functional component collects data (e.g. user equipment service and QoS types, neighboring base station interference measurement reports, buffer status, available transmit power) within the base station.

The server informs the base station not capable of running SON algorithm what data to pass to the server.

The server collects the inputs required by the algorithm and pass the inputs from the base stations not capable of running SON algorithm to SON functional components of SON capable base stations.

All SON functional components and the server run the algorithm on received inputs.

The server sends the radio resource configuration to base stations not capable of running SON algorithm based on algorithm output.

SON functional component sends configuration messages to corresponding functional components.

In another embodiment, SON functional component 201 coordinates, but not limited to, radio resource allocation with neighboring base stations by way of a centralized server, such that the coordination can take place in following steps:

SON functional components in coordination group do not need to agree on an algorithm since the algorithm is run on server. The server can decide what algorithm to run itself. The server needs to inform the base station what data to process and/or pass to the server. One example of such algorithm can include some or all of the following radio resource allocations: orthogonal code, time, frequency, time-frequency, spatial/beam and power;

SON functional component 201 collects data (e.g. user equipment measurement reports, user equipment service types, user equipment QoS types, neighboring base station interference measurement reports, buffer status, available transmit power) within the base station;

SON functional component 201 process the data to produce the inputs required by the algorithm;

SON functional component 201 sends the produced inputs to a server (e.g. algorithm server);

The server collects produced inputs from all the base stations in a coordination group, runs the algorithm and multicasts the algorithm output to individual base station to reduce the data traffic due to the exchange of algorithm inputs;

SON functional component 201 sends configuration messages to corresponding functional components base on received algorithm output.

Figure 3:
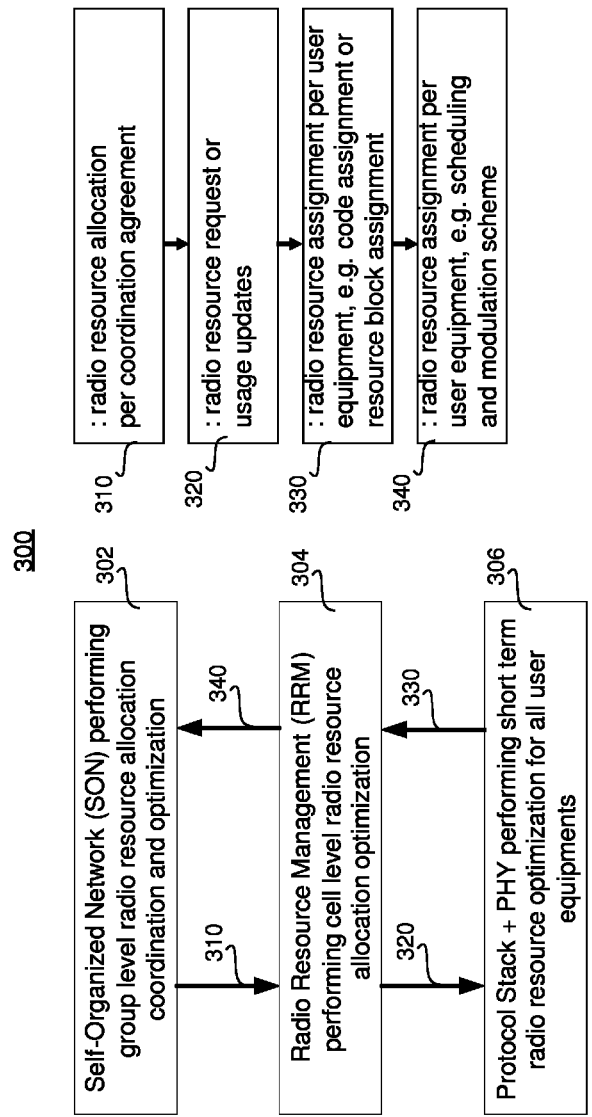
FIG. 3 illustrates an example of multi-level radio resource management and allocation optimization from an algorithm point of view.

Referring to FIG. 3 there is illustrated a multi-level radio resource management and allocation optimization algorithm architecture 300. Algorithms in a SON 100 performs group level (i.e. among neighboring base stations) optimization 302 on radio resource management and allocation. Algorithms in a RRM 214 perform cell level 304 (i.e. within a base station) optimization on radio resource management and allocation. Algorithms in protocol stack+PHY 226 perform short term radio resource optimization 306 on individual user equipment.

The SON functional component 201 in a base station 101 collaborates with the rest of functional components to perform multi-level radio resource management and allocation optimization process 300 across the base stations 101*a* to 101*d* and within each base station, such that SON functional component 201 performs radio resource management and allocation optimization at the group level (i.e. among neighboring base stations), RRM functional component 214 performs radio resource management and allocation optimization, based on what SON functional component has allocated for this base station, at individual base station level (i.e. among user equipments connected to this base station) and scheduler within MAC functional component performs short term radio resource optimization for all user equipments.

For example, SON functional component 201 receives parameters and measurements (e.g. user equipment service types, quality of service levels, received signal strength indications, channel quality indications, buffer status, available transmit power, neighboring base station interference measurement, spatial channel indicator such as ranking indicator and pre-coding matrix index) from other functional components within the base station. The SON functional component 201 processes the parameters and measurements into inputs for selected optimization algorithm. The SON functional component 201 coordinates with neighboring base stations and invokes the algorithm 302 to decide optimized resource allocation. The SON functional component 201 sends the resource allocation decision 310 for its base station to the RRM functional component 214. The RRM functional component 214 invokes the algorithm 304 to optimize the resource allocation among the user equipments within the cell. The RRM functional component 214 sends the resource allocation decision 320 to the RRC functional component 218. The RRC functional component 214 configures the MAC functional component. The scheduler in MAC functional component performs short-term optimization algorithm 306 per user equipment.

In another example, RRM functional component 214 performs the algorithm to optimize the resource allocation among the user equipments within the cell. RRM functional component 214 sends the radio resource request 340 to SON functional component 201. The SON functional component 201 also receives parameters and measurements from other functional components within the base station. The SON functional component 201 processes the parameters and measurements into inputs for selected optimization algorithm. The SON functional component 201 coordinates with neighboring base stations and invokes the algorithm to decide optimized resource allocation. The SON functional component 201 sends the resource allocation decision 310 for its base station to the RRM functional component 214. The RRM functional component 214 performs the algorithm 304 based on the inputs from the SON functional component 201 to optimize the updated resource allocation 310 among the user equipments within the cell. The RRM functional component 214 sends the resource allocation decision 320 to RRC functional component. The RRC functional component configures the MAC functional component. The scheduler in MAC functional component performs short-term optimization algorithm per user equipment 306.

In another embodiment, SON functional component 201 utilizes optimization algorithm that uses multiple variables to optimize a cost function with respect to multiple neighboring base stations. For example, when the utility function is data rate based, the above optimization problem is to allocate radio resource to maximize:

$$\sum_{i \in G} U_i(r_i),$$

where $U_i(\bullet)$ is the utility function for cell i, $r_i$ is instantaneous data rate or averaged data rate, depending on the definition of the utility function for cell i. G is a set that consists of all the neighboring base stations. Other constraints can be added in the optimization process, such as user data rate needs, transmit power constraints, fairness constraints such as time lapsed since being served, user quality of service requirement or constraints such as delay or buffer status constraints or buffer status constraints, neighboring cell interference constraints. Mathematically, it is to optimize the following cost function with respect to radio resource allocation parameters such as time, frequency, orthogonal code, spatial resource such as beam forming parameters, transmit power etc.

$$\sum_{i \in G} U_i(r_i, P_{tx,i}, t_i, t_{delay,i}, I_{buffer,i}, P_{intference,i}),$$

where $U_i(\bullet)$ is the utility function for cell i.

In another embodiment, RRM functional component 214 utilizes optimization algorithm similar to above but with respect to the user equipments in one cell and based on the radio resource allocation parameters passed from the SON functional component 201 as part of the constraints.

In another embodiment, SON functional component collaborates with RRM functional component to perform, but not limited to, admission control by coordinating with neighboring base station. For example, user equipment makes an access request to a base station and there is no resource available to the user equipment. RRM functional component request the SON functional component to coordinate with neighboring base stations for more resource. SON functional component sends the coordination result to RRM functional component. RRM functional component makes decision on the access request based on the coordination result.

In another embodiment, SON functional component 201 collaborates with RRM functional component 214 to perform, but not limited to, load balancing by coordinating with neighboring base stations. For example, the RRM functional component 214 of base station 101b detects over loading such that the resource allocated for the base station is insufficient to fulfill user equipments' needs. The RRM functional component 214b request the SON functional component 201b to coordinate with neighboring base stations 101a, 101c and 101d for more resource to relief the loading. The SON functional component 201b sends the coordination result to the RRM functional component 214b. The RRM functional component 214b adjusts resource allocation based on the coordination result. In another example, the RRM functional component 214 of a base station 101 detects surplus in resource due to load dropping. The RRM functional component 214 informs the SON functional component 201 on surplus resource. The SON functional component 201 can offer the surplus resource to neighboring base stations.

Having now fully described the inventive subject matter, it will be appreciated by those skilled in the art that the same can be performed within a wide range of equivalent modifications, variations and adaptations without departing from the scope patent disclosure.

While this disclosure has been described in connection with specific embodiments thereof, it will be understood that it is capable of further modifications. This application is intended to cover any variations, uses, or adaptations of the disclosure following, in general, the principles of the disclosure and including such departures from the present disclosure as come within known or customary practice within the art to which the disclosure pertains and as may be applied to the essential features hereinbefore set forth.

What is claimed is:

1. A method for self-organizing a network comprising the steps of:
    in a wireless network comprising a plurality of base stations, providing each base station with a self-organizing network component coupled to a radio resource management component and a radio resource control component;
    establishing a self-organizing network layer for performing radio resource coordination for the base stations using at least one of the self-organizing network components;
    each self-organizing network component receiving radio allocation information from their respective radio resource management component and providing that radio allocation information to the self-organizing network layer;
    the self-organizing network layer determining radio resource allocation for the plurality of base stations within the network;
    the self-organizing network layer accepting a request for additional radio resource from the self-organizing component of one of the plurality of base stations;
    said self-organizing network components of the plurality of base stations coordinating, via the self-organizing network layer, radio resource allocation among the plurality of base stations to accommodate the request;
    wherein:
    each base station forms at least one coordination groups based on a list of neighbors received from a location server;
    self-organizing components within a coordination group agree on an algorithm, and each self-organizing component within a group runs on same set of inputs from neighboring base stations and its own.

2. A method as claimed in claim 1 wherein coordinating of radio resources relates to physical channels.

3. A method as claimed in claim 1 wherein coordinating of radio resources relates to transmit power.

4. A method as claimed in claim 1 wherein coordinating of radio resources relates to spatial resource allocation.

5. A method as claimed in claim 1 wherein coordinating of radio resources relates to admission control.

6. A method as claimed in claim 1 wherein coordinating of radio resources relates to load balancing.

7. A self-organizing wireless network comprising:
    a plurality of end user equipment;
    a plurality of base stations, each base station including:
        a self-organizing network component, a radio resource management component and a radio resource control component,
        the self-organizing network component coupled to a first interface for communicating with corresponding self-organizing network components in other base stations and coupled to second interface for receiving radio resource allocation information from the radio resource management component; and
    a self-organizing network layer for performing radio resource coordination for the plurality of base stations and formed by at least one of the self-organizing network component of the plurality of base stations communicating with the other self-organizing networks components via respective first interfaces;
    the radio resource management components of each of the plurality of base stations accepting an allocation from the self-organizing network layer and managing respective usage of that allocation through the radio resource control component for the end user equipment associated with its base station;
    wherein:
    each base station forms at least one coordination groups based on a list of neighbors received from a location server;
    self-organizing components within a coordination group agree on an algorithm, and each self-organizing component within a group runs on same set of inputs from neighboring base stations and its own.

8. A self-organizing wireless network as claimed in claim 7 wherein coordinating of radio resources relates to physical channels.

9. A self-organizing wireless network as claimed in claim 7 wherein coordinating of radio resources relates to transmit power.

10. A self-organizing wireless network as claimed in claim 7 wherein coordinating of radio resources relates to spatial resource allocation.

11. A self-organizing wireless network as claimed in claim 7 wherein coordinating of radio resources relates to admission control.

12. A self-organizing wireless network as claimed in claim 7 wherein coordinating of radio resources relates to load balancing.

* * * * *